United States Patent [19]

Sophianopoulos et al.

[11] Patent Number: 4,883,676

[45] Date of Patent: Nov. 28, 1989

[54] METHOD OF FORMING LIQUID SMOKE

[75] Inventors: Spyros Sophianopoulos, Willowdale; Kenneth S. Darley, Ajax, both of Canada; Louis Sair, Evergreen Park, Ill.

[73] Assignee: The Griffith Laboratories, Limited, Scarborough, Canada

[21] Appl. No.: 52,065

[22] Filed: May 21, 1987

[51] Int. Cl.$^4$ .............................................. A23B 4/04
[52] U.S. Cl. ..................................... 426/314; 426/650
[58] Field of Search ............... 426/314, 650, 655, 332; 201/2.5, 30, 32, 37, 40

[56] References Cited

U.S. PATENT DOCUMENTS 3,152,914  10/1964  Taylor .................................. 426/314
3,462,282  8/1969   Fessmann ............................. 426/314
4,270,464  6/1981   Kerres .................................. 426/314

FOREIGN PATENT DOCUMENTS 2834081  2/1980  Fed. Rep. of Germany ...... 426/314
862891   9/1981  U.S.S.R. ............................. 426/332

*Primary Examiner*—George Yeung
*Attorney, Agent, or Firm*—Sim & McBurney

[57] ABSTRACT

Liquid smoke, useful for imparting flavor to a food product, is produced by condensing the products of combustion of dry sawdust which is maintained as an undisturbed thin layer in a combination zone while a sweeping air stream passes through the combustion zone. Much higher yields are obtained at much lower char levels than are possible using prior art procedures.

11 Claims, No Drawings

METHOD OF FORMING LIQUID SMOKE

FIELD OF INVENTION

The present invention relates to a new method of forming liquid smoke.

BACKGROUND OF THE INVENTION

A common method of imparting a wood smoke flavour to foods is by contacting the food directly with the smoke produced upon combustion of wood or sawdust. The food, thus exposed to the smoke, gradually takes on the desired smokey flavour and character, and also a smoked appearance.

The smoke produced from wood fires in smoke generators cannot readily be controlled and the flavour imparted depends on a number of variable factors, including intensity and type of wood smoke, the area, time and temperature of contact, and the extent of deposition of wood tars on the food surface.

For these reasons, there have been developed aqueous smoke flavour solutions, or "liquid smoke", for use in achieving the controlled imparting of flavour to the food product being treated by contact therewith.

In U.S. Pat. No. 3,106,473, there is described a process for producing an aqueous wood smoke flavoured solution in which wood smoke produced on burning sawdust is subjected to repetitive countercurrent extraction with water.

U.S. Pat. No. 3,873,741 describes a controlled carbonizing combustion of sawdust in the presence of a regulated air supply, and an aqueous extraction system, so as to obtain a liquid having improved flavour and an enhanced ability to colour food products treated therewith. The product is said to be readily dilutable, produced in high yield and completely free from carcinogenic materials.

U.S. Pat. No. 4,298,435 indicates that problems were associated with the batch processes described in U.S. Pat. No. 3,873,741, including the variability of the quality of the liquid smoke product obtained and a serious fire and explosion hazard associated with the large amounts of air used therein. In the process described in U.S. Pat. No. 4,298,435, dry hardwood sawdust having a moisture content below 5% is fed into one end of a rotary calciner wherein it is calcined at a temperature below 925° F. (about 500° C.) in the absence of added air.

Smoke produced by the combustion passes into a packed tower through which an aqueous liquid containing condensed smoke is recycled until the desired smoke concentration is reached, along the lines described in U.S. Pat. No. 3,106,473. Tar is allowed to settle out to eliminate carcinogens.

In all the prior art liquid smoke producing processes of which the applicants are aware, char is produced along with the liquid smoke, possibly as a result of decomposition of volatiles in the heating chamber. The production of the char as well as non-condensible combustion products significantly decreases the theoretical yield of liquid smoke product based on sawdust. Generally, the prior art processes produced yields of liquid smoke based on sawdust of only about 45 to 50%.

SUMMARY OF INVENTION

We have now surprisingly found that, by effecting combustion of sawdust under certain controlled conditions, a significantly higher yield of liquid smoke can be attained with very little char or ash production. Yields of liquid smoke of 90% or greater based on sawdust are readily attainable.

In particular, we have found that by effecting combustion of dry sawdust as a thin layer in a sweeping dry air stream, we produce a product gas stream which contains a high proportion of condensible vapours and little or no by-product char is formed.

While not wishing to be bound by any theory as to why the present invention is effective, it is thought that the thin layer of sawdust permits efficient heat transfer to the sawdust and efficient volatilization of volatile combustion products and that the flow of air provides not only oxygen for the combustion but also acts as a sweeping gas to purge the volatile materials from the exposed surface of the sawdust before they are able to decompose.

The condensibles present in the product gas stream from the combustion operation may be recovered by direct condensation by cooling or by contact with water to effect dissolution. It is preferred to effect condensation by cooling, since the use of extraneous water to dissolve the smoke results in unnecessary dilution of the smoke, and may inhibit maximum retention of organic compounds. Different fractions may be recovered from the product gas stream, if desired.

GENERAL DESCRIPTION OF INVENTION

The present invention effects combustion of sawdust of any desired wood, for example, hickory or maple. The sawdust is combusted dry, generally at a moisture content of less than about 5 wt. %, while the air also is provided dry, typically at a moisture content of less than about 1.

If the sawdust is not used dry, then the heating of the sawdust initially drives off the moisture, which, upon condensation, dilutes the product and hence is undesirable. The reference to the sawdust as being dry herein, refers to its condition during combustion. It is preferred, therefore, to predry the sawdust to the dry condition prior to feed to the combustion zone.

Moisture in the air stream is also disadvantageous in that it tends to dampen the combustion and again is present as diluent in the product. Reference is made herein to the use of an air stream, since this is the most convenient form of molecular oxygen-containing gas stream. Oxygen is required to sustain combustion while a gas flow rate through the combustion zone is required to remove the products of combustion, so as to minimize char formation.

Any desired oxygen-containing gas stream having any desired oxygen concentration and any desired flow rate of such stream consistent with the above-noted criteria can be employed. For an air stream, we have found satisfactory results can be obtained if a linear velocity of about 1.25 to about 2.5 ft/min. is employed. Depending on oxygen concentration in the gas stream and the equipment employed, a linear velocity outside this range may be appropriate.

The combustion of the sawdust to produce the liquid smoke on condensation of the condensibles may be carried out in a batch manner. From the practical standpoint of the production of commercial quantities of the liquid smoke, this is impractical and, accordingly, attempts have been made to effect combustion continuously by continuously feeding sawdust to a combustion zone and continuously conveying the sawdust through the combustion zone as it is combusted.

Operation in this manner produced a more dilute product having a lesser staining power than was achieved using a batch operation. It is preferred, therefore, that the thin sawdust layer be undisturbed during combustion.

One method of effecting the process of the invention to produce commercial quantities of liquid smoke which we have found to be satisfactory is a so-called "continuous batch" operation wherein individual changes or batches of sawdust are successively deployed in the combustion zone, each as a thin layer in a suitable container, combusted and then removed from the combustion zone to be replaced by the next container. However, any other desired procedure for providing undisturbed sawdust in the combustion zone, for example, a belt on which the sawdust is provided and which continuously passes through the combustion zone.

A thin layer of sawdust in the combustion zone is essential to the obtaining of a high yield product. The thickness of the layer should be no greater than will permit efficient heat transfer and efficient volatilization of volatile combustion products. We have obtained satisfactory results using a thickness of sawdust layer of about 1 to about 2 cm, however other thicknesses may be appropriate in other equipment. If insufficient sawdust is present, combustion is too rapid and large amounts of water are produced while, if the amount of sawdust is too high, the smoke produced becomes trapped and is destroyed, which decreases the yield of liquid smoke produced.

The sawdust generally of a particle size as supplied from the sawing of wood and may be pre-sieved to remove chips and other oversize particles. We have used sawdust having a particle size of about −5 mesh but larger particle sizes may be used. While the particle size distribution may vary widely within the sawdust, it is preferred to employ wood particles having a relatively uniform particle size, since such materials produce a higher quality liquid smoke product.

Sawdust from any desired wood species, including both hardwood and softwood species, may be employed to produce liquid smoke capable of imparting to food the smokey flavour characteristic of the wood species. Examples of wood species useful in the present invention are maple, hickory and beech.

The sawdust may be combusted to produce the condensible smoke on a batch basis, a continuous basis, or, preferably, a semi-continuous basis, as described above. The combustion temperature may vary widely generally up to about 1000° C., typically about 600° C. on a batch basis and typically about 300° C. on a continuous basis, to effect the combustion.

For a batch operation, higher temperatures generally are necessary and satisfactory results have been obtained at about 600° C. For continuous and semi-continuous operation, lower temperatures are appropriate, generally within a range of about 250° C. to about 350° C., preferably about 290° C. to 300° C. Higher temperatures within this range tend to result in more dilute liquid smoke.

The combustion zone in which the sawdust combustion is effected may be of any desired construction consistent with the ability to provide the sawdust as a thin layer exposed to an air stream flowing over the surface of the sawdust through the combustor. In one preferred aspect of the present invention, the combustion is effected in a heated chamber having an inlet for the air stream flowing through the chamber and an outlet is connected to a downwardly-extending pipe or conduit to drain any condensed volatiles and to minimize tar formation. We have observed that contact between metals and the sawdust has a deleterious effect both on yield and quality of liquid smoke. It is preferred, therefore, to provide the sawdust in contact with glass or similar material to improve the yield and product quality.

A by-product common to all prior art processes is insoluble tar. The process of the present invention generally significantly produces less tar than prior art processes.

The present invention, therefore, represents a significant breakthrough in the production of liquid smoke, in that significantly greater yields are obtained with little or no solid by-product.

EXAMPLES

Example 1:

This Example illustrates the production of liquid smoke in a batch process.

An experimental smoke generator and recovery unit was set up comprising a tubular generator sized 25 cm × 7 cm, located with its axis horizontal and surrounded by a heating jacket. An air flow stream was provided through the generator and an outlet was connected to a downwardly-sloped pipe which lead to a series of five condensor flasks cooled by liquid nitrogen for condensing liquid smoke produced by the generator.

In one set of experiments, the generator was constructed of stainless steel No. 304 while, in a second set of experiments, the stainless steel tube was fitted with a quartz glass liner. A series of batch runs was conducted for each generator, using 25 g of maple sawdust, dried to 3% moisture in each run, an air flow of 4 SCFH, and at a temperature rising initially from ambient to about 600° C. over about an 0.5 hour period and then held at 600° C. for about an hour.

The total quantity of smoke produced from the runs was determined along with the efficiency of conversion of the sawdust to liquid smoke. The results obtained are reproduced in the following Table I:

TABLE I

| Generator | # of Runs | Total Amount of Sawdust (g) | Collected Smoke (g) | % Eff. |
|---|---|---|---|---|
| Stainless Steel | 42 | 1050 | 788 | 75.0 |
| Quartz-liner Stainless Steel | 60 | 1500 | 1345 | 89.6 |

The lower efficiency for the stainless steel generator resulted from a reaction between the smoke and the steel, which was evident from observed surface corrosion of the interior of the stainless steel tube. Nevertheless, the efficiencies obtained are remarkably higher than conventionally obtained in liquid smoke production of about 45 to 50%. Physical examination of the generators did not reveal any significant char formation in either generator.

The condensed smoke obtained was analyzed and the analysis is set forth in the following Table II:

TABLE II

|  | Stainless Steel | Quartz Liner |
| --- | --- | --- |
| Acidity % | 12.2 | 13.2 |
| Moisture % | 56.6 | 53.6 |
| Phenols (as 2,4-dimethoxyphenol) mg/ml | 15.0 | 20.4 |
| Carbonyls % | 22.2 | 25.2 |
| Staining index 525 nm | 55 | 114.8 |
| Staining index 440 nm | 73 | 140.8 |
| Acetone % |  | 0.52 |
| Methanol % |  | 3.58 |
| Formaldehyde ppm |  | 4813 |

The results of this Table II show the superior quality of the liquid smoke produced in the presence of the quartz liner.

In the above Table II and in the remainder of the Examples below, the various parameters were measured in the following manner:

(a) Acidity:

1 ml of liquid smoke is diluted with 100 ml of distilled water. The solution is titrated to pH 8.15, as determined by a pH meter, using 0.1N sodium hydroxide solution. The titration is considered complete when the pH remains at or near 8.15 for at least 15 seconds. The total acidity is calculated as percent by weight of acetic acid on the basis of 1 ml of 0.1N NaOH=60.06 mg of acetic acid.

(b) Moisture:

Standard Karl Fischer method.

(c) Phenols:

1 ml of liquid smoke is diluted to 100 ml with distilled water and 5 ml of this water is diluted again to 100 ml with distilled water. To 5 ml of the latter solution is added 1 ml of 0.05% w/v of cupric sulfate solution as colour stabilizer, 5 ml of borate buffer and 0.1 ml of Gibb's reagent in a 25 ml screw cap tube. The borate buffer is formed by dissolving 34.8 g of sodium borate decahydrate in 900 ml of distilled water, adjusting to pH 9.8 with concentrated sodium hydroxide solution and diluting to 1 liter using distilled water. Gibb's reagent is formed by adding 40 ml of absolute alcohol to 160 mg of 2,6-dibromo-n-chloro-p-benzoquinoneimine. The contents of the tube are mixed by gently inverting about ten times. The tube is stored in a dark place for 30 minutes, 10 ml of n-butanol then is added and the contents of the tube mixed by gently inverting about ten times. The tube is placed in a dark place and the phases allowed to separate for 10 minutes. The contents of the butanol layer then is transferred to a cuvette and the absorbance at 630 nanometers is measured in a spectrophotometer.

The absorbance is converted to mg of 2,6-dimethoxyphenol per 100 ml of solution by comparison to a standard curve produced using known quantities of 2,6-dimethoxyphenol, after deducting for absorbance of a blank sample. The value read from the curve then is divided by the volume of liquid smoke per 100 ml of final dilution to provide the quantity of phenols in mg per ml of liquid smoke.

(c) Carbonyls:

About 25 ml of crushed ice is placed in a 300 ml conical flask along with 10 ml of dilute phosphoric acid. The dilute phosphoric acid is produced by diluting 10 ml of 85 percent phosphoric acid with 90 ml of distilled water. 20 ml of 0.1N iodine solution and 5 ml of sample solution are added and the solution titrated with 0.05N thiosulphate solution. The iodine solution is prepared by completely dissolving 20 g of potassium iodide using 30 to 40 ml of distilled water, adding 12.7 g of iodine and stirring until completely dissolved, and diluting to 1 liter with distilled water. The thiosulphate solution was prepared by dissolving 12.4 g of sodium thiosulphate pentahydrate and 0.1 g of sodium carbonate in distilled water and diluting to 1 liter with distilled water. The starch solution is prepared by making a paste of 1 g of soluble starch and a little cold water, pouring the paste into 100 ml of boiling water and boiling for one minute. The sample solution is prepared by diluting 10 ml of liquid smoke to 50 ml with methanol and adding 10 ml of buffered bisulfite to 10 ml of the methanol solution. The buffered bisulfite solution is prepared by dissolving 47.5 g of sodium bisulfite and 75 g of sodium phosphate in 500 ml of distilled water and adjusting to pH 6.5±0.1. A blank titration is done for correction.

The concentration of carbonyls in the sample then is provided by the following formulae and converted to a percentage:

$$\text{g/100 ml of sample} = M \times MW \times \frac{100}{1000}$$

$$M = \frac{(S - B)}{\text{ml of sample}} \times \frac{50}{10} \times \frac{50}{5} \times \frac{N}{2}$$

wherein

S=sample titration volume, ml thiosulphate
B=blank titration volume, ml thiosulphate
N=normality of thiosulphate solution
M=molarity of carbonyls in liquid smoke
MW=average molecular weight of carbonyls (assumed to be 100)

(e) Staining Index:

10 ml of a 2.5% w/v glycine solution in acetic acid is added to 1 ml of liquid smoke in a test tube and immersed in a water bath at 85° C. for 30 minutes. 10 ml of glacial acetic acid is added and the test tube cooled immediately in cold running water for 2 to 3 minutes. The sample is diluted to 25 ml with distilled water. Using water as a reference solvent to set the spectrophotometer at zero absorbance at the chosen wavelength (525 nm or 440 nm), absorbance of the solution is measured. The staining index then is calculated, as follows:

$$SI = \text{net absorbance} \times 1.8 \times C \times 100$$

where the net absorbance is calculated by subtracting the reading for an unheated sample and C is the correction factor arrived at by calibration of the spectrophotometer.

Example 2:

This Example illustrates the formation of liquid smoke by a semi-continuous process.

The apparatus described in Example 1 was employed in a further set of experiments wherein the stainless steel tube was fitted with a glass liner. A series of semi-continuous runs was performed in which successive batches of maple sawdust were fed to the generator in trays made from Pyrex (trademark) glass semi-circular in shape and measuring 23.5 cm long and 5 cm diameter. In each tray, the sawdust was spread evenly throughout the length of the tray as a thin layer.

Each tray was introduced through a door at the air inlet end of the generator and the door immediately closed. The sawdust at an initial moisture content of 3% was combusted under the reaction conditions for a predetermined period of time, after which the glass tray was removed and replaced by a fresh batch of sawdust and the process repeated. In this way, semi-continuous processing of sawdust was achieved.

The results obtained in a first series of experiments using the semi-continuous process at an air flow rate of 6 SCFH are set forth in the following Table III:

TABLE III

| Batch Weight g | No. | Time Per Batch hrs | Staining Index 525 nm | Water % | Maximum temp. °C. | Base temp. °C. | Yield % |
|---|---|---|---|---|---|---|---|
| 15 | 4 | 1.25 | 47.7 | 70.9 | 340 | 290 | 92.4 |
| 15 | 3 | 1.67 | 51.7 | 69.3 | 346 | 290 | 93.8 |
| 15 | 4 | 1.5 | 49.4 | 61.2 | 321 | 290 | 95.6 |
| 25 | 2 | 2.5 | 52.7 | 66.3 | 306 | 270 | 92.7 |
| 25 | 3 | 2.0 | 61.5 | 62.4 | 312 | 270 | 88.9 |
| 25 | 3 | 2.0 | 56.3 | 61.7 | 311 | 270 | 84.9 |
| 15 | 4 | 1.5 | 41.9 | 68.1 | 320 | 270 | 90.5 |
| 15 | 4 | 1.5 | 40.4 | 69.7 | 310 | 260 | 93.7 |
| 25 | 3 | 2.0 | 45.2 | 65.5 | 306 | 260 | 92.5 |
| 25 | 3 | 2.0 | 47.5 | 64.0 | 316 | 250 | 93.7 |
| 20 | 3 | 2.0 | 51.4 | 61.6 | 321 | 260 | 90.8 |

From the data presented in Table III, batch size evidently has an effect on liquid smoke quality, with a higher staining index being obtained with the larger batch. In addition, it would appear that about 290° C. is the optimum base temperature at this air flow rate, in view of the lower water production achieved.

In an additional series of experiments, the air flow rate was decreased to about 5 SCFH and the effect observed for different batch weights at the same base temperature but with different maximum temperatures. The results obtained are reproduced in the following Table IV:

TABLE IV

| Batch Weight g | No. | Time Per Batch hrs | Staining Index 525 nm | Water % | Maximum temp. °C. | Base temp. °C. | Yield % |
|---|---|---|---|---|---|---|---|
| 25 | 2 | 3.0 | 68.1 | 56.7 | 322 | 290 | 90.1 |
| 25 | 3 | 2.0 | 67.4 | 56.0 | 331 | 290 | 94.4 |
| 25 | 2 | 3.0 | 67.1 | 60.7 | 338 | 290 | 90.1 |
| 25 | 3 | 2.0 | 65.0 | 58.2 | 346 | 290 | 58.2* |
| 20 | 3 | 2.0 | 64.1 | 58.7 | 338 | 290 | 94.8 |
| 20 | 2 | 3.0 | 65.3 | 58.2 | 321 | 290 | 89.9 |

*Pure nitrogen gas streams. This shows that the presence of oxygen in the gas streams is required.

As may be seen from the data presented in Table IV, the lower flow rate produced an improvement in the staining index for the liquid smoke produced.

The effect of particle size on liquid smoke quality was tested in a yet further series of experiments. The sawdust was initially screened through a 12 mesh screen into a coarse fraction and a fine fraction and each fraction was processed at a base temperature of 290° C., an air flow rate of 5 SCFH and a 25 g batch size.

The results obtained are set forth in the following Table V:

TABLE V

| Particle Size | No. of Batches | Time Per Batch hrs | Staining Index 525 nm | Water % | Maximum temp. °C. | Yield % |
|---|---|---|---|---|---|---|
| Coarse | 2 | 3.0 | 75.1 | 59.8 | 343 | 94.7 |
| Coarse | 2 | 3.0 | 81.5 | 56.1 | 342 | 90.6 |
| Coarse | 3 | 2.0 | 73.4 | 57.3 | 334 | 95.5 |
| Fine | 3 | 2.0 | 79.4 | 56.1 | 330 | 96.1 |
| Fine | 3 | 2.0 | 81.4 | 55.8 | 349 | 94.1 |
| Fine | 3 | 2.0 | 76.0 | 57.3 | 348 | 93.7 |

As may be seen by comparison between the results of Table V and those set forth in Table IV, a significant positive effect on liquid smoke quality is achieved as a result of particle size uniformity. For the coarse fraction in Table V, the yields as a percentage of sawdust were calculated and are set forth in the following Table VI:

TABLE VI

| Parameter | wt. % of Sawdust |
|---|---|
| Total condensate | 94.1 |
| Ash | 2.2 |
| Mass balance | 96.8 |
| Liquid smoke yield | 89.3 |
| Tar estimate | 2.8 | note: Total condensate was measured gravimetrically in the collection flasks and for this reason is a higher value than the total smoke yield plus tar, which are measured after decantation.

In addition, the liquid smoke was analyzed and compared with a commercial liquid smoke manufactured and sold by the applicants following the prior art procedures, identified as GL 1250, and this comparison is tabulated as Table VII below:

TABLE VII

| | Product of Invention | GL 1250 |
|---|---|---|
| Acidity % | 11.1 | 12.4 |
| Phenols, DMP, mg/ml | 21.3 | 19.2 |
| Staining Index, 525 nm | 81.4 | 79.2 |
| Carbonyls % | 24.1 | 21.8 |
| Moisture % | 55.8 | 50 to 55 |

As may be seem from this Table VII, the liquid smoke produced by the method of the invention has comparable properties to those of the commercial product. However, the product of the invention is obtained in a significantly greater yield with no char formation.

Example 3:

This Example illustrates the application of the process of the invention to an alternate wood species.

The semi-continuous procedure of Example 2 was repeated to fourteen 25 g batches of beechwood, coarse ground in the laboratory. The operating parameters are set forth in the following Table VIII:

TABLE VIII

| Parameter | Value |
|---|---|
| Sawdust moisture content | 3% |
| Base temperature | 290° C. |
| Air flow | 4 SCFH |
| Run time per batch | 2 hrs |
| Maximum temperature | 346° C. |

The yields of product were calculated as a percentage of sawdust and the liquid smoke was analyzed. This data is presented in the following Tables IX and X:

TABLE IX

| Total condensate | 94.2% |
|---|---|

TABLE IX-continued

| | |
|---|---|
| Ash | 1.3% |
| Mass balance | 95.5% |
| Liquid smoke yield | 88% |
| Tar estimate | 1.3% |

TABLE X

| | |
|---|---|
| Acidity % | 13.7 |
| Phenols, DMP, mg/ml | 27.8 |
| Staining Index, 525 nm | 83.2 |
| Carbonyls % | 24.0 |
| Moisture % | 42.4 |

The effect of a further decrease in air flow rate on product quality was investigated for this wood species by lowering the flow rate to 2 SCFH for a further series of sawdust batches. The yields of product were calculated as a percentage of sawdust and the liquid smoke obtained was analyzed. The results obtained are set forth in the following Tables XI and XII:

TABLE XI

| | |
|---|---|
| Total condensate | 78.4 |
| Ash (char) | 6.0 |
| Mass balance | 84.5 |
| Liquid smoke yield | 75.2 |
| Tar estimate | 3.0 |

TABLE XII

| | |
|---|---|
| Acidity % | 13.1 |
| Phenols, DMP, mg/ml | 31.1 |
| Staining Index, 525 nm | 103.3 |
| Carbonyls % | 18.5 |
| Moisture % | 49.9 |

As may be seen by comparison of Tables XI and XII with Tables IX and X, a stronger smoke was obtained at the lower flow rate but at the expense of a lower mass balance resulting from the production of non-condensible gases and incomplete ashing.

Example 4:

This Example illustrates the use of the liquid smoke of the invention in the smoking of meats.

A combined sample of liquid smoke from repetitive runs according to Example 1 was used to assess performance on product in comparison with GL 1250 (see Example 2). Use of the liquid smoke by conventional means in an atomization system using a laboratory smokehouse on bacon showed no difference in product between the test and GL 1250. Dipping tests showed the test smoke to be at least as good in staining performance as GL 1250.

SUMMARY OF THE DISCLOSURE

In summary of this disclosure, the present invention provides a novel method of producing liquid smoke by using a unique combination of process conditions for the combustion of sawdust. Modifications are possible within the scope of this invention.

We claim:

1. A method of forming a liquid smoke, which comprises:
    feeding dry sawdust to a combustion zone and forming a thin layer thereof having an exposed upper surface in said combustion zone,
    feeding a dry molecular oxygen-containing gas stream to said combustion zone,
    heating said combustion zone to a temperature at least sufficient to effect combustion of said sawdust,
    combusting said sawdust in said thin layer while said molecular oxygen-containing gas stream sweeps over said exposed surface of the combusting sawdust in said combustion zone from an inlet thereto to an outlet therefrom to produce a combustion product gas stream containing condensible vapors, said sawdust layer having a thickness no greater than that which will permit efficient heat transfer to the sawdust layer in said combustion zone and efficient volatilization of volatile combustion products from the sawdust layer into the sweeping molecular oxygen-containing gas stream to form said product gas stream while the formation of char and ash in said combustion zone is substantially avoided,
    removing said product gas stream from said combustion zone from said outlet therefrom, and
    condensing said condensible vapors from said removed product gas stream to produce liquid smoke.

2. The method of claim 1 wherein said layer of sawdust is maintained substantially undisturbed during said combustion.

3. The method of claim 2 carried out continuously.

4. The method of claim 2 carried out semi-continuously on successive batches of sawdust.

5. The method of claim 1 wherein said combustion is effected at a temperature of about 250° to about 350° C.

6. The method of claim 1 carried out continuously or semi-continuously and said combustion is effected at a temperature of about 290° to about 300° C.

7. The method of claim 1 wherein said dry gas stream is air.

8. The method of claim 7 wherein said air has a linear velocity of about 1.25 to about 2.5 ft/min.

9. A method of forming liquid smoke, which comprises:
    providing a plurality of batches of dry sawdust in the form of thin layers, each said sawdust layer having a thickness no greater than that which will permit efficient heat transfer to the sawdust and efficient volatilization of volatile combustion products while the formation of char and ash is substantially avoided,
    heating a combustion zone to a temperature of about 280° C. to about 350° C.,
    flowing a dry air stream into said combustion zone and passing said air stream from an inlet to said combustion zone to an outlet from said combustion zone,
    introducing successive ones of said batches to said combustion zone,
    effecting combustion of said sawdust in each successively-introduced batch while said gas stream sweeps over the exposed surface of the combusting sawdust to produce a product gas stream containing condensible vapors while char production is avoided,
    removing the product gas stream from said outlet from the combustion zone, and
    condensing said condensible vapors from said removed product gas stream to produce an aqueous liquid smoke in high yield greater than about 90%.

10. The method of claim 9 wherein said sawdust has a moisture content of less than 5 wt. %, said air stream has a linear velocity of about 1.25 to about 2.5 ft/min., each sawdust layer is undisturbed during said combustion and each sawdust layer has a thickness of about 1 to about 2 cm.

11. The method of claim 10 wherein each batch of said sawdust is in contact with glass during said combustion.

* * * * *